(12) United States Patent
Donderici et al.

(10) Patent No.: US 11,280,929 B2
(45) Date of Patent: Mar. 22, 2022

(54) METHOD OF DETECTING SUBSTANCE SATURATION IN A FORMATION

(71) Applicant: Halliburton Energy Services, Inc., Houston, TX (US)

(72) Inventors: Burkay Donderici, Houston, TX (US); Ahmed E. Fouda, Houston, TX (US); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 546 days.

(21) Appl. No.: 15/531,673

(22) PCT Filed: Sep. 19, 2016

(86) PCT No.: PCT/US2016/052460
§ 371 (c)(1),
(2) Date: May 30, 2017

(87) PCT Pub. No.: WO2018/052449
PCT Pub. Date: Mar. 22, 2018

(65) Prior Publication Data
US 2018/0335541 A1 Nov. 22, 2018

(51) Int. Cl.
| | |
|---|---|
| G01V 3/28 | (2006.01) |
| G01V 3/24 | (2006.01) |
| G01V 3/32 | (2006.01) |
| G01V 3/20 | (2006.01) |
| G01N 27/06 | (2006.01) |
| G01V 99/00 | (2009.01) |

(52) U.S. Cl.
CPC ............... G01V 3/28 (2013.01); G01N 27/06 (2013.01); G01V 3/20 (2013.01); G01V 3/24 (2013.01); G01V 3/32 (2013.01); G01V 99/005 (2013.01)

(58) Field of Classification Search
None
See application file for complete search history.

(56) References Cited

U.S. PATENT DOCUMENTS 3,982,176 A * 9/1976 Meador .................... G01V 3/30
324/341
4,517,836 A 5/1985 Lyle, Jr. et al.
(Continued)

OTHER PUBLICATIONS

International Search Report and Written Opinion dated May 10, 2017; International PCT Application No. PCT/US2016/052460.

*Primary Examiner* — Lina M Cordero
(74) *Attorney, Agent, or Firm* — McGuireWoods LLP

(57) ABSTRACT

A substance saturation sensing method includes making a resistivity measurement of a formation proximate to a well with a logging tool prior to installation of a casing string in the well. After the casing string is installed in the well, a first set of measurements of the formation is made with a monitoring system to generate a measured response. A set of calibration values is calculated based on the first set of measurements to produce a resistivity that matches the resistivity measurement. A second set of measurements of the formation is made with the monitoring system during or after saturating of a substance occurs in the formation. At least one parameter indicative of the saturating of the substance in the formation is determined based on the second set of the measurements and the set of calibration values.

30 Claims, 10 Drawing Sheets

(56) References Cited

U.S. PATENT DOCUMENTS

| | | | | |
|---|---|---|---|---|
| 4,656,422 A * | 4/1987 | Vail, III | ............... | G01R 33/022 324/303 |
| 4,687,995 A * | 8/1987 | Warren | ................... | G01V 3/28 324/341 |
| 4,748,415 A * | 5/1988 | Vail, III | ................... | G01V 3/28 324/339 |
| 4,786,874 A * | 11/1988 | Grosso | ..................... | G01V 3/20 340/853.4 |
| 4,882,542 A * | 11/1989 | Vail, III | ................... | G01V 3/24 324/368 |
| 5,043,668 A * | 8/1991 | Vail, III | ................. | G01V 11/00 324/368 |
| 6,294,917 B1 * | 9/2001 | Nichols | .................... | G01V 3/28 324/339 |
| 6,308,136 B1 * | 10/2001 | Tabarovsky | ............ | G01V 3/28 285/124.1 |
| 6,400,148 B1 * | 6/2002 | Meyer | ................... | G01R 33/50 324/300 |
| 6,466,872 B1 * | 10/2002 | Kriegshauser | ........... | G01V 3/28 702/7 |
| 6,470,274 B1 * | 10/2002 | Mollison | ................ | G01V 11/00 702/7 |
| 6,534,986 B2 | 3/2003 | Nichols | | |
| 6,686,736 B2 * | 2/2004 | Schoen | ................... | G01V 3/32 324/303 |
| 6,870,498 B1 * | 3/2005 | Morgan | ................ | H01Q 13/02 342/14 |
| 7,260,478 B2 * | 8/2007 | Dubourg | ................ | G01V 3/20 702/7 |
| 7,937,222 B2 * | 5/2011 | Donadille | ............... | G01V 3/28 702/7 |
| 10,329,903 B2 * | 6/2019 | Ramakrishnan | ........ | G01V 1/50 |
| 2001/0026156 A1 * | 10/2001 | Dubourg | .................. | G01V 3/20 324/312 |
| 2005/0067190 A1 * | 3/2005 | Tabanou | .................. | G01V 3/24 175/50 |
| 2005/0257960 A1 * | 11/2005 | McGregor | .............. | E21B 49/10 175/24 |
| 2006/0015258 A1 * | 1/2006 | Dubourg | .................. | G01V 3/20 702/11 |
| 2006/0136135 A1 | 6/2006 | Little et al. | | |
| 2009/0259403 A1 * | 10/2009 | Akbar | ...................... | G01V 3/38 702/7 |
| 2010/0132448 A1 * | 6/2010 | Donadille | ............... | G01V 3/28 73/152.08 |
| 2011/0037474 A1 | 2/2011 | Dashevsky et al. | | |
| 2011/0061439 A1 | 3/2011 | Dong et al. | | |
| 2012/0011927 A1 * | 1/2012 | Badri | ..................... | G01N 13/00 73/152.05 |
| 2012/0293179 A1 * | 11/2012 | Colombo | ................ | G01V 3/26 324/339 |
| 2013/0096833 A1 * | 4/2013 | Hanna | ...................... | G01V 3/24 702/11 |
| 2013/0166215 A1 * | 6/2013 | Bittar | ....................... | G01V 3/38 702/11 |
| 2014/0060819 A1 * | 3/2014 | Pindiprolu | .............. | E21B 33/14 166/250.01 |
| 2014/0062489 A1 * | 3/2014 | Pindiprolu | ............. | G01N 13/00 324/347 |
| 2014/0191761 A1 * | 7/2014 | San Martin | ........... | E21B 47/011 324/339 |
| 2014/0257780 A1 * | 9/2014 | Jing | ...................... | G01V 99/005 703/6 |
| 2014/0367092 A1 * | 12/2014 | Roberson | ................ | E21B 47/01 166/250.01 |
| 2014/0375320 A1 | 12/2014 | Liu et al. | | |
| 2016/0003962 A1 * | 1/2016 | Sena | ........................ | G01V 3/28 324/339 |
| 2016/0154133 A1 * | 6/2016 | Donderici | ............... | G01V 1/50 367/12 |
| 2018/0231681 A1 * | 8/2018 | Katterbauer | ............. | G01V 3/02 |

\* cited by examiner

METHOD OF DETECTING SUBSTANCE SATURATION IN A FORMATION

This is a 371 national stage application of International Patent Application No. PCT/US16/52460 filed Sep. 19, 2016, the disclosure of which is incorporated by reference herein in its entirety.

FIELD OF THE DISCLOSURE

The present disclosure relates generally to reservoir monitoring and, more specifically, it relates to a method of detecting saturation of a substance in a formation proximate to a well.

BACKGROUND

Boreholes are created using drilling rigs to extract oil or natural gas from reservoirs. Once a borehole is created, well-logging is often performed to make a detailed record of the geologic formations penetrated by the borehole, and a permanent reservoir monitoring system may be deployed to detect flooding of water in the nearby formation. Such monitoring system, however, does not provide accurate flooding detection results because sensors are often dislocated and/or disoriented during the installation. Also, the sensors may be pushed against rough surfaces of the borehole wells and damaged during the installation. Hence, the reservoir monitoring systems very often provide inaccurate flooding detection results, which could result in disrupting, interfering or prematurely terminating production of oil or other natural resources. Accordingly, there is a need for providing accurate flooding detection results even after a reservoir monitoring system is installed on a permanent basis.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
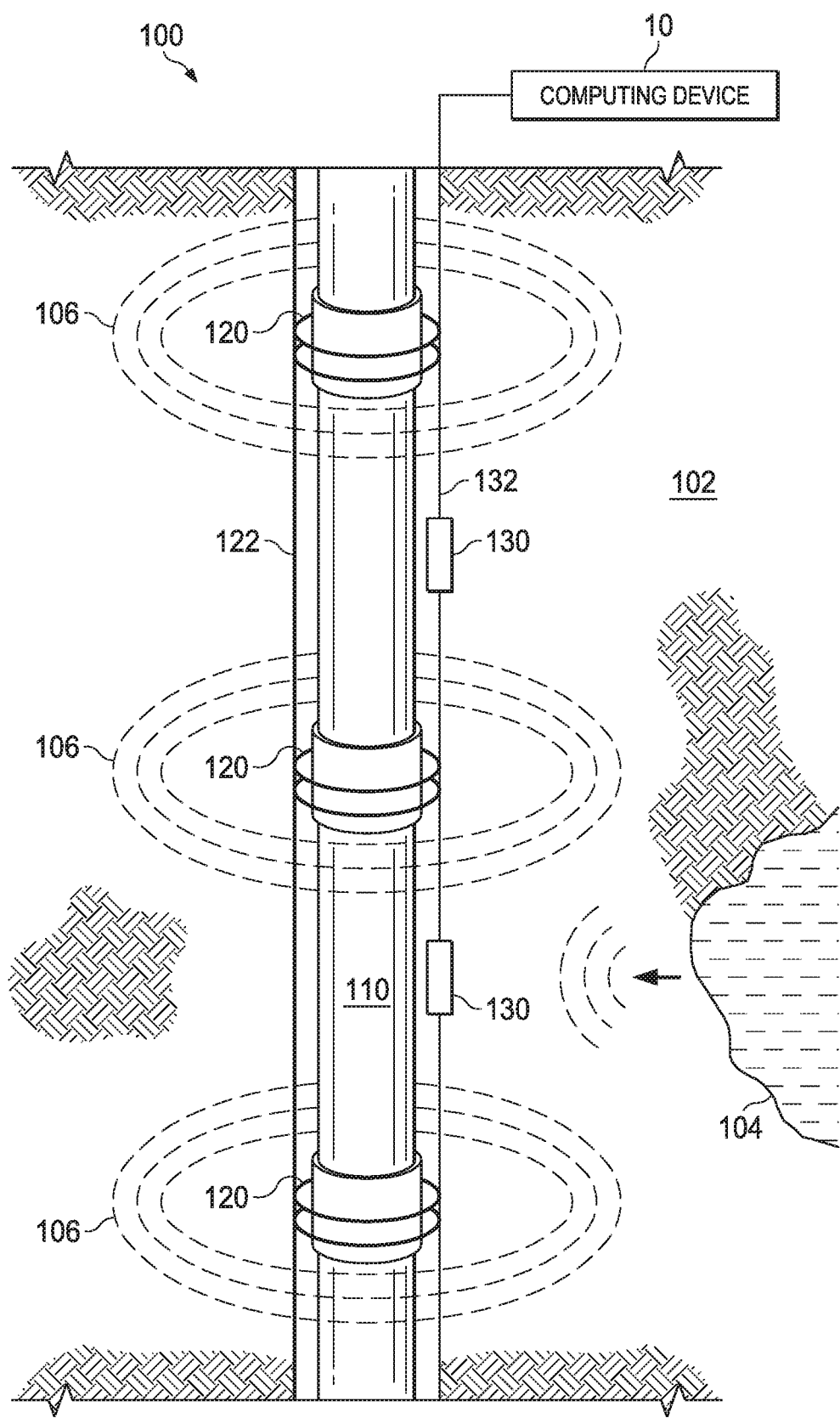
FIG. 1 illustrates a side perspective view of a monitoring system, constructed according to the principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The disclosure is related to accurately detecting saturation of a substance in a formation proximate to a well by conducting post-installation calibration of a monitoring system, of which sensors may have been displaced, dislocated or damaged during or after the installation. The substance may be water and the saturation may be flooding of water in the formation. The substance may be gas, a mixture of gas and other substances. The saturation of such substance in the formation may disrupt, interfere or prematurely terminate production of oil or other natural resources. After conducting post-installation calibration, saturation of any such substance may be more accurately detected with the monitoring system.

For the post-installation calibration, a measured or observed response may be obtained from the actual monitoring system, and may then be matched to a synthetic or predicted response that would have been measured by an ideal system. The synthetic response may be computed numerically using available information, such as, for example, monitoring system design (e.g., sensor placement, sensor spacing, sensor orientations, and/or the like), operation parameters (e.g., current level, operation frequency, and/or the like), a resistivity model of the formation surrounding the well, and/or the like. Alternatively, the resistivity model may be built from a geostatistical population of petrophysical data within structural models interpreted from seismic and well log data, which is described below in detail with reference to FIG. 5.

FIG. 1 shows a monitoring system 100 for detecting substance saturation in a formation 102, constructed according to the principles of the disclosure. The monitoring system 100 may measure electromagnetic (EM) values of a formation 102 proximate to a production well or a well casing 110. The monitoring system 100 may be a borehole-deployed EM permanent monitoring system. The system 100 may include a plurality of EM transmitters 120 and a plurality of EM sensors 130. The transmitters 120 and sensors 130 may be distributed along a monitoring zone of interest in the formation 102 surrounding the well casing 110. The transmitters 120 may generate EM fields 106 that include electrical and magnetic field components. These components may include both a primary field that is independent of any interaction with the formation 102, and a secondary field which may be produced as a result of its interaction with the formation 102. Properties of the secondary field may also be a function of a resistivity of the formation 102. The sensor 130 may measure both the primary and secondary fields, which, by using an appropriate algorithm, may be imaged as or inverted to a resistivity model.

The system 100 may further include a power line 122 and a communication line 132, which extend along the well casing 110. The power line 122 may be connected to and power the transmitters 120. The communication line 132 may transmit the EM field values measured by the sensors 130. The system 100 may comprise a fiber optic system. For example, the communication line 132 may include a fiber optic cable for transmitting the EM field values measured by the sensors 130 to a computing device 10. The computing device 10 may be any device programmed to carry out a set of arithmetic or logical operations automatically. The computing device 10 may be equipped and programmed to carry out various mathematical operations and simulations mentioned in this disclosure.

The electrical properties of the formation 102 may be sensitive to saturation by a substance 104 (e.g., flooding of water, gas, etc.). In this disclosure, a time-lapse EM sensing may be carried out to exploit the sensitivity to saturation by the substance 104 within the formation 102. The time-lapse EM sensing method may involve generating one or more sets of quasi-static and dynamic data, which may enhance reservoir management workflows and optimize production and injection practices. Based on these data sets, more accurate decisions may be made on appropriate intervention strategies and operation guidance in case of unfavorable or unexpected production scenarios, such as, for example, flooding of water 104 in an early life of the well.

Figure 2A:
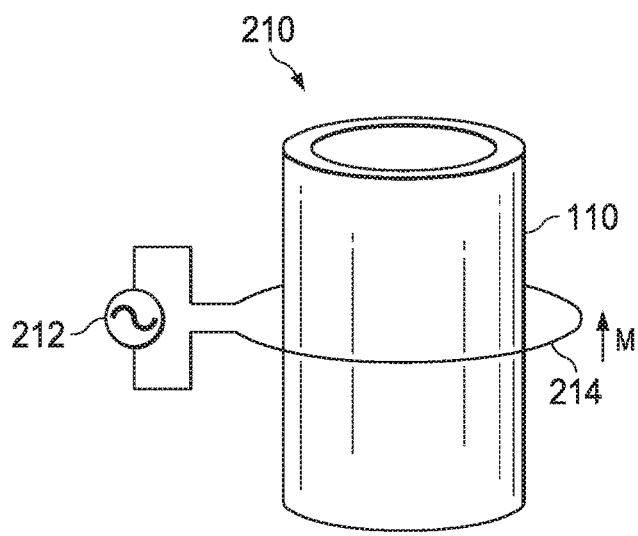
FIGS. 2A, 2B and 2C illustrate side perspective views of various sensors of the monitoring system, constructed according to the principles of the disclosure.
Figure 2B:
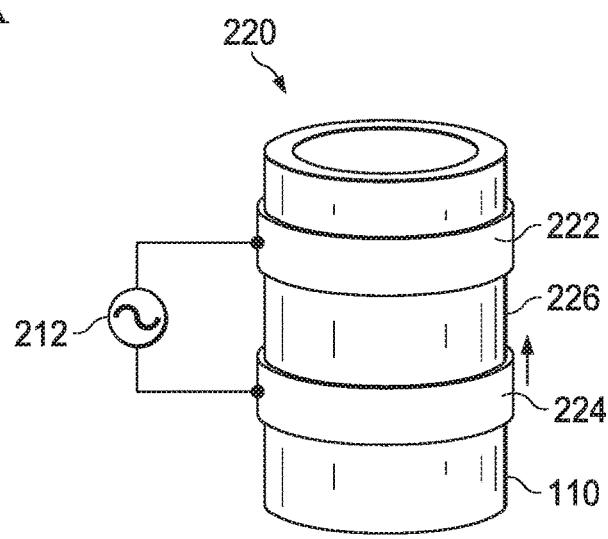
Figure 2C:
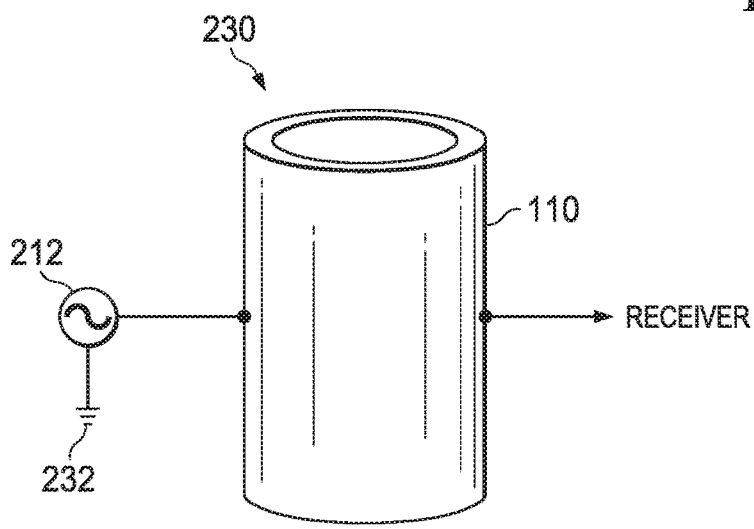

FIGS. 2A, 2B and 2C show various EM sensing systems 210, 220, 230 for the monitoring system 100, constructed according to the principles of the disclosure. The EM sensing systems 210, 220, 230 may be permanently installed behind or along the well casing 110. In particular, FIG. 2A shows a magnetic dipole type sensing system 210, which may include a plurality of magnetic dipole transmitters (coils) 214 (only one shown) and sensors 130 (shown in FIG. 1). The coil 214 may be connected to a signal generator 212 and wrapped about the casing 110 that may be covered with non-conducting sleeves. The coil 214 may generate EM fields having an axial component parallel to the casing 102, which may be measured by the sensor 130 (shown in FIG. 1) at a location axially spaced along the casing 110.

FIG. 2B shows an electric bipole type sensing system 220, which may include a plurality of pairs of spatially separated monitoring electrodes or bipoles 222, 224 (only one pair shown) coupled to the signal generator 212. In operation, a current may be injected from one of the electrodes 222, 224 and returns to the other. The electrodes 222, 224 may be collars of the casing 110. With this configuration, the current may flow parallel to the casing 110, and hence the longitudinal portion of the casing 110 spanned by the electrodes 222, 224 may be insulated with an insulation layer 226 to avoid shorting of the current. The sensor 130 (shown in FIG. 1) may measure the axial component of the EM field created by the current, or, equivalently, the potential difference between the electrodes 222, 224.

FIG. 2C shows the sensing system 230 that uses the casing 110 as a source. A current may be injected through the casing 110 and leak into the formation 102 (shown in FIG. 1) toward a distant return electrode 232. With this configuration, the casing 102 may act as an extended monopole. The sensor 130 may measure potential differences in the radial direction at different sections of the casing 110.

Once the monitoring system 100 is installed on a permanent basis, the response measured by the system 100 may not coincide with a predicted response due to various reasons, for example, dislocation or disorientation of the sensing system, damages to the sensing system during or after the installation, drifting with temperature and/or pressure, deterioration of the sensing system (e.g., electrode degradation), and/or the like. Hence, post-deployment calibration may be performed to compensate for the discrepancy before the monitoring system 100 is used for detecting substance saturation in the formation 102.

Figure 3:
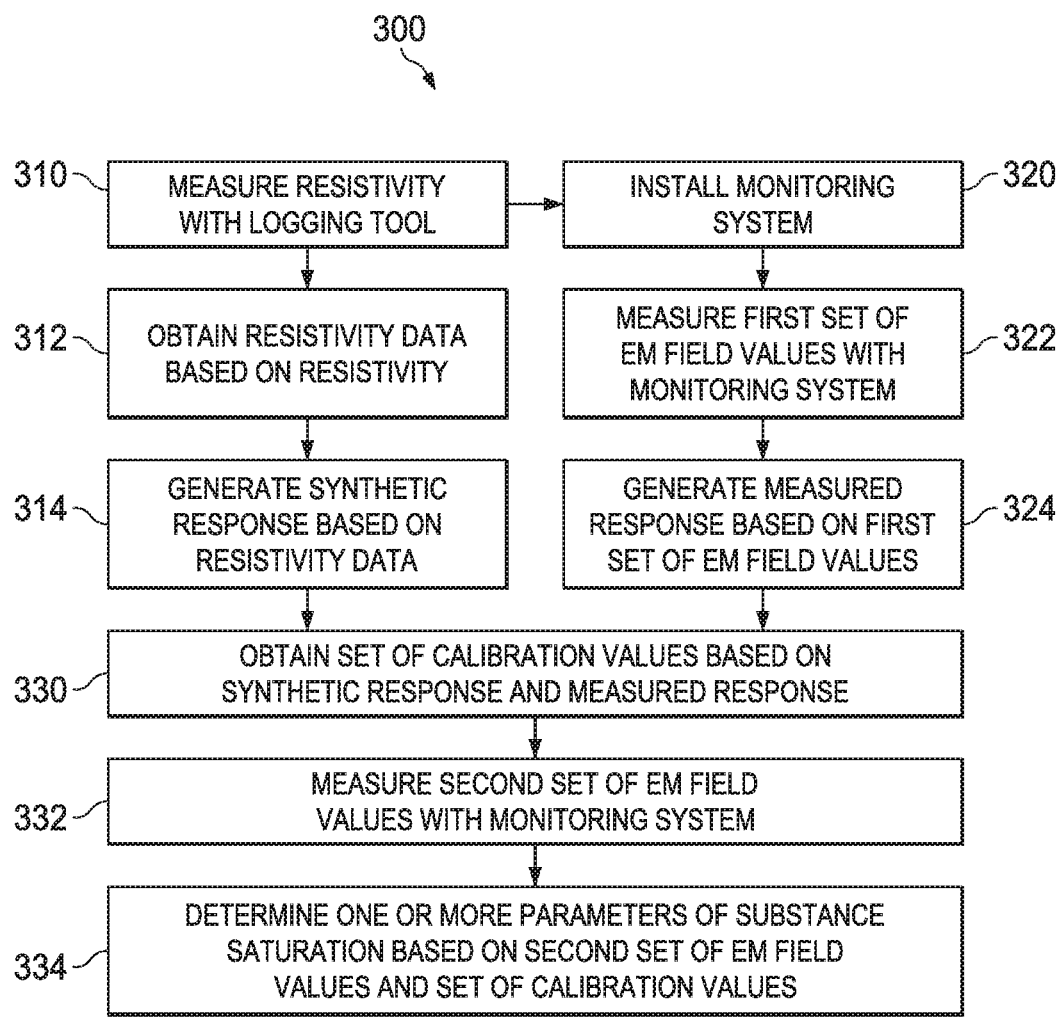
FIG. 3 illustrates a flow chart of a method of detecting substrate saturation according to the principles of the disclosure.

FIG. 3 illustrates a flow chart of a method 300 of detecting saturation of a substance in a formation proximate to a well. After a borehole is drilled, a resistivity of the formation proximate to the borehole may be measured (at 310), for example, by using a logging tool or the like. Based on the resistivity measured at 310, resistivity data of the formation may be obtained (at 312), and a synthetic response may be generated (at 314) based on the resistivity data from 312, for example, using the computing device 10. Also, after measuring the resistivity (at 310), a casing string, a monitoring system, and/or the like, may be installed in the well (at 320), and a first set of EM field values may be measured (at 322) using the monitoring system. Based on the first set of EM field values from 322, a measured response may be generated (at 324), for example, using the computing device 10. For example, calibration values for each measurement may be obtained by taking the ratio of the synthetic response (from 314) to the measured response (from 324). The well may be completed after the monitoring system is installed. Based on the synthetic response (from 314) and the measured response (from 324), a set of calibration values may be obtained (at 330), for example, using the computing device 10. After the calibration value set is obtained, a second set of EM field values may be measured (at 332) using the monitoring system. Then, one or more parameters that are indicative of saturating of a substance in the formation may be determined based on the second set of EM filed values and the set of calibration values (at 334), for example, using the computing device 10. The step 332 of measuring a set of EM field values may be repeated periodically or performed at any time to detect changes in the one or more parameters, thereby providing a real-time detection of substance saturation in the formation.

Figure 4:
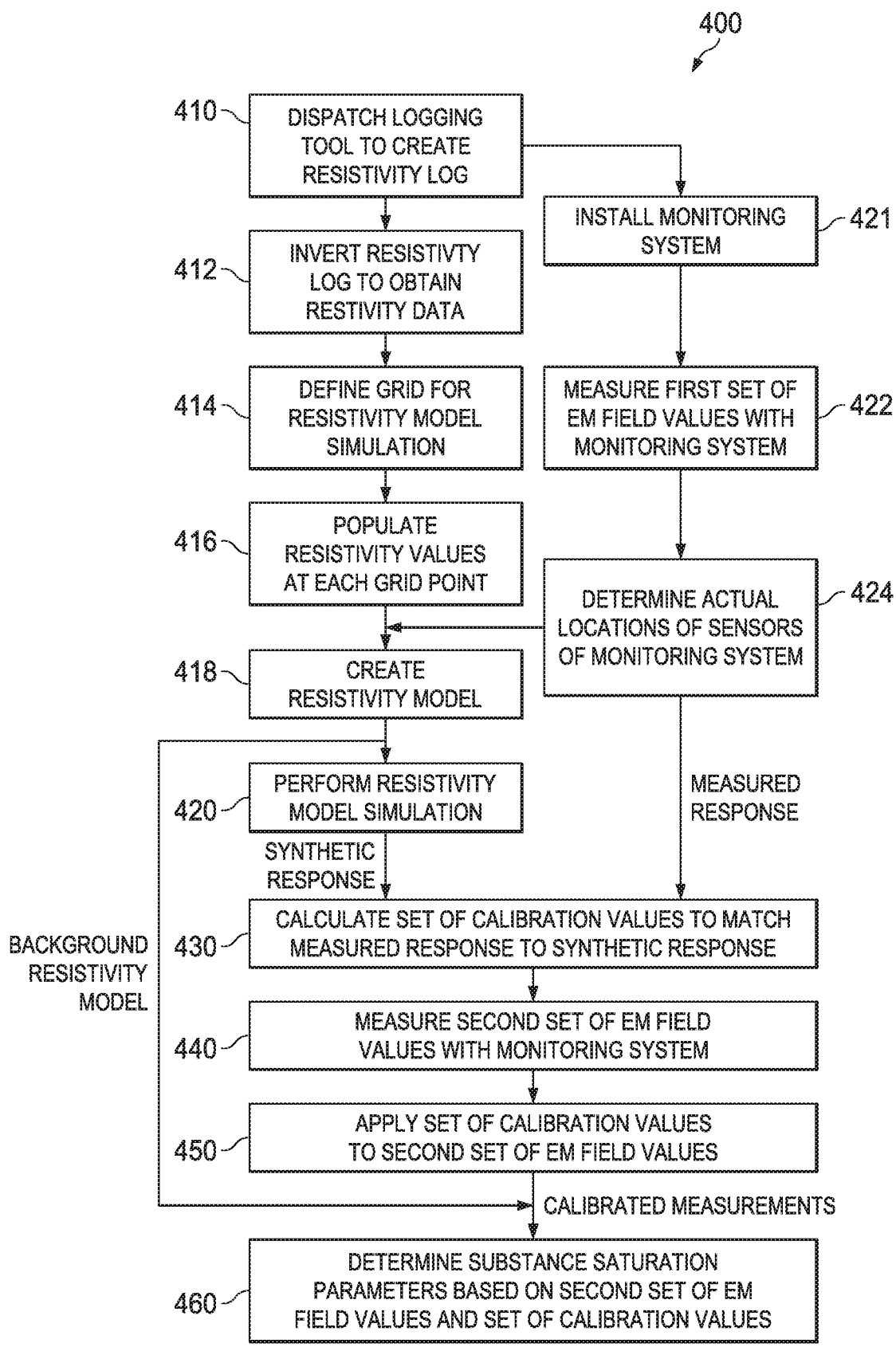
FIG. 4 illustrates a flow chart of a more detailed method of detecting substrate saturation according to the principles of the disclosure.

FIG. 4 illustrates a flow chart of a more detailed method 400 of detecting saturation of a substance in a formation proximate to a well based on matching the measured response and the synthetic response. To generate a measured response, a logging tool may be dispatched to create a resistivity log of the formation (at 410). For example, one or more open-hole resistivity logs may be created. Then, the resistivity log may be converted to obtain resistivity data (at 412), for example, using the computing device 10 (shown in FIG. 1). For example, well-based resistivity data may be derived from one or more of logging-while-drilling (LWD) resistivity data, open-hole multi-component wireline resistivity data, open-hole wireline resistivity data, open-hole wireline dielectric data, through-casing resistivity data, and/or the like.

Figure 5:
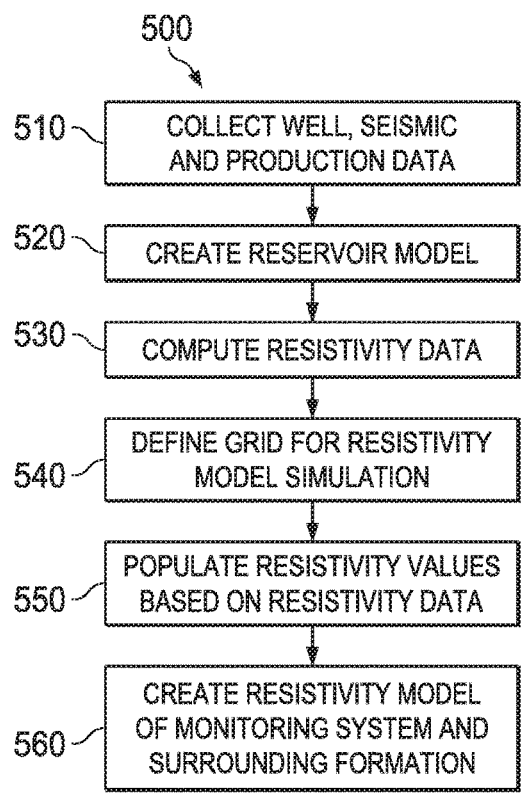
FIG. 5 illustrates a flow chart of a method of deriving a resistivity model based on petrophysical quantities according to the principles of the disclosure.

Alternatively or additionally, the resistivity data may be computed, for example, using the computing device 10, from petrophysical data, such as, for example, porosity, fluid saturation, and/or the like, using analytical relationships, for example, Archie's law or the like. Petrophysical data may be extracted from joint interpretation of the well logs and seismic and production data. For example, FIG. 5 shows a flow chart of a method 500 of deriving a resistivity model based on petrophysical data. The well properties, seismic and production data may be collected (at 510), and a reservoir model may be created (at 520) based on the collected data (from 510), for example, using the computing device 10. Resistivity data of the formation may be computed (at 530), and a grid of the formation may be defined (at 540) for a resistivity model simulation, for example, using the computing device 10. Resistivity values of the grid points may be populated (at 550) based on the resistivity data, and then a resistivity model of the monitoring system and the surrounding formation may be created (at 560), for example, using the computing device 10.

Referring back to FIG. 4, a grid may then be defined (at 414), which may be required to construct a resistivity model. The grid may include a plurality of grid points. A resistivity value of each grid point in the resistivity model may then be populated (at 416) from, for example, interpolation and/or extrapolation of the well-based formation resistivity data (from 412), well casing properties, borehole size and shape, cement resistivity data, and/or the like, using, for example, the computing device 10. A resistivity model of the formation may then be created (at 418) to simulate the monitoring system installed in the formation, for example, using the computing device 10.

The resistivity model may be constructed based on the resistivity data from 412 and other information, such as, for example, borehole size and shape (e.g., caliper logs), well casing properties and completions, motoring system properties, and/or the like. A multi-arm caliper may be used to construct the borehole shape in 3D. The well casing properties, such as, for example, outer diameter, thickness, electrical conductivity, magnetic permeability, and/or the like, of a specific casing type are typically readily available. A resistivity and chemical properties of a specific cement type may also be readily available.

Figure 6A:
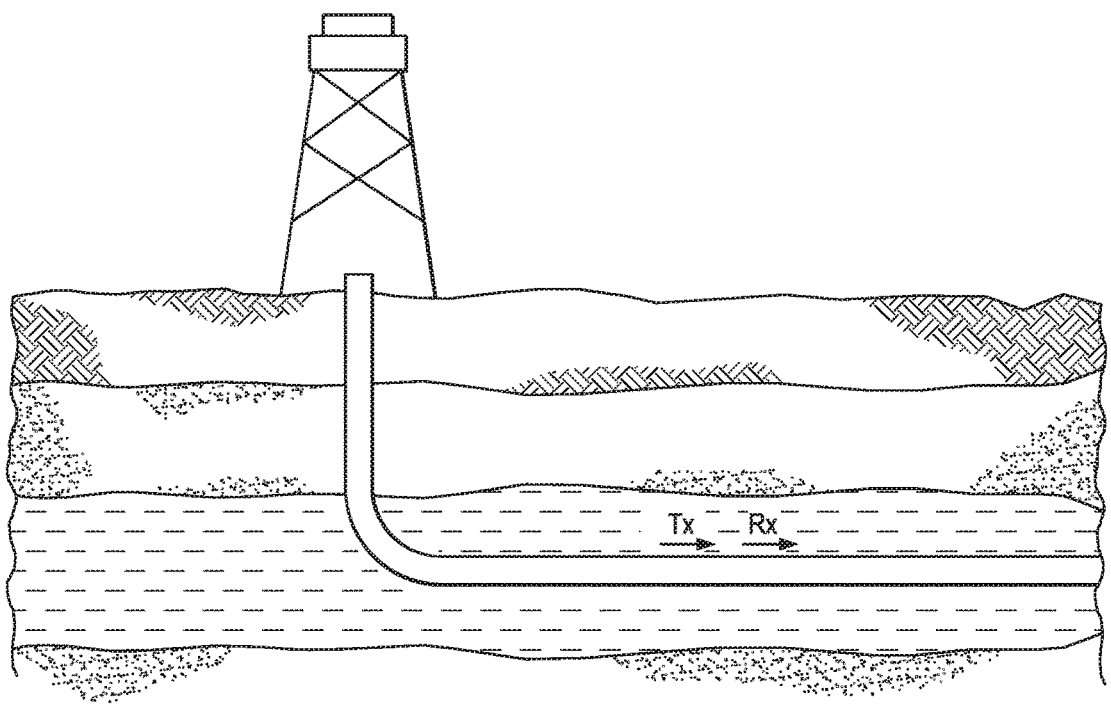
FIGS. 6A and 6B illustrate three dimensional (3D) resistivity models, constructed according to the principles of the disclosure.
Figure 6B:
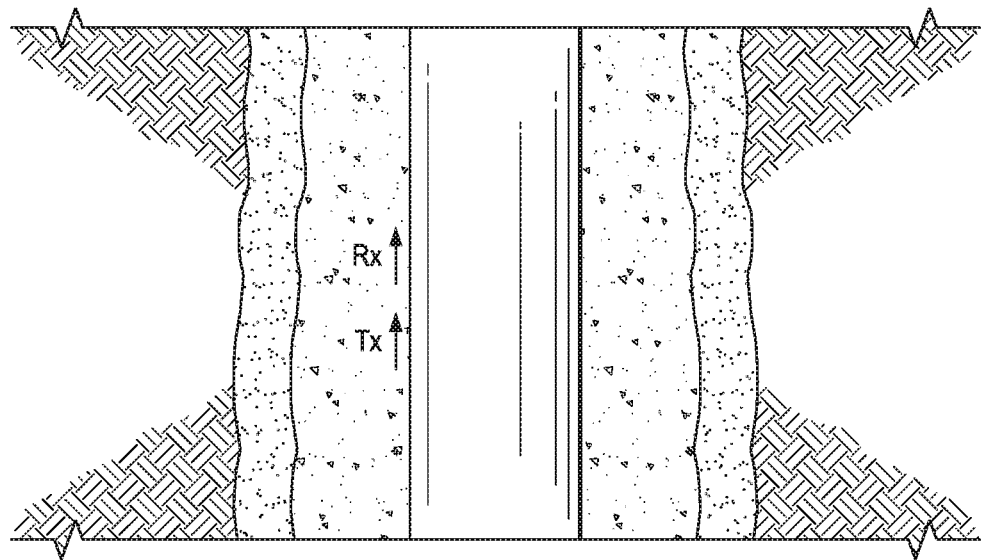

In an embodiment, a three-dimensional (3D) resistivity model may be constructed as a juxtaposition of volume elements populated by discrete values of the electrical properties, and the EM field values may be computed using a 3D numerical simulator. As shown in FIGS. 6A and 6B, 3D resistivity models may be used for high deviation and horizontal wells and cases, in which a 3D borehole shape is expected to affect the performance of the monitoring system.

Figure 7A:
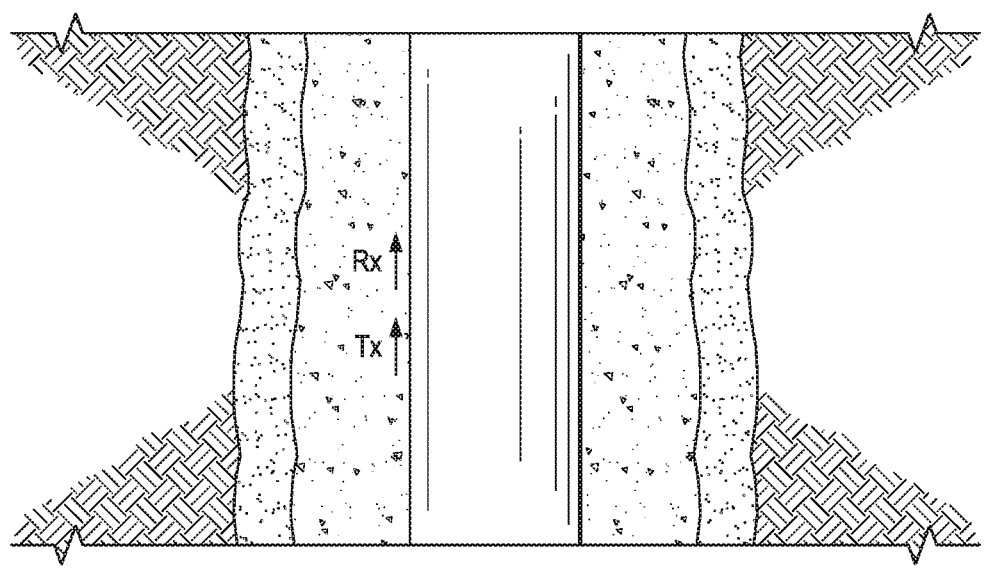
FIGS. 7A and 7B illustrate a two dimensional (2D) resistivity model and a two-and-a-half dimensional (2.5D) resistivity model, respectively, constructed according to the principles of the disclosure.
Figure 7B:
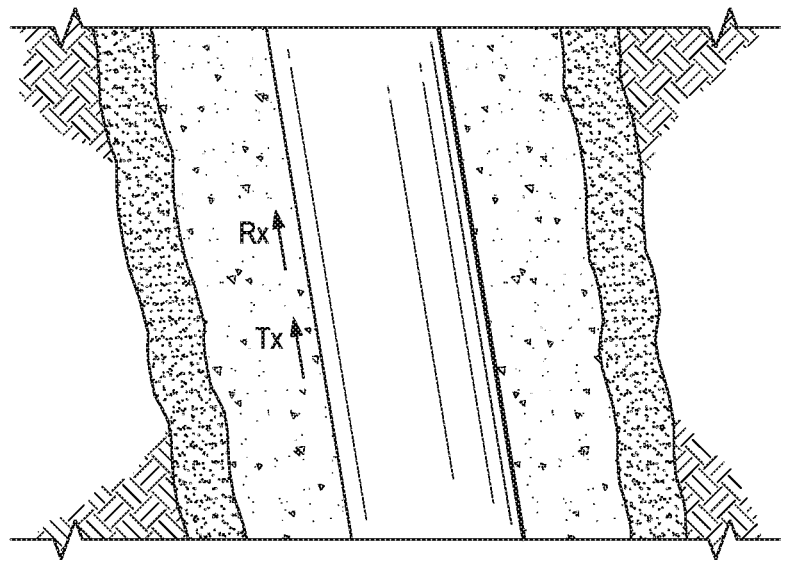

In another embodiment, a two-dimensional (2D) resistivity model or a two-and-a-half dimensional (2.5D) resistivity model may be constructed as a juxtaposition of area elements populated by discrete values of the electrical properties (assuming that the electrical properties are homogeneous in the 2D resistivity model's strike direction) and the EM field values, sensitivities and/or the like, which may be modeled using a 2D or 2.5D numerical simulator. 2D resistivity models may be used for vertical wells, and 2.5D resistivity models may be used for low deviation wells, as shown in FIGS. 7A and 7B. 2D or 3D models may be high fidelity models that simulate the borehole as well as the formation properties. Deviations between the measurements and the synthetic responses computed from those models may mainly be due to intrinsic imperfections in the sensing system of the monitoring system.

Figure 8:
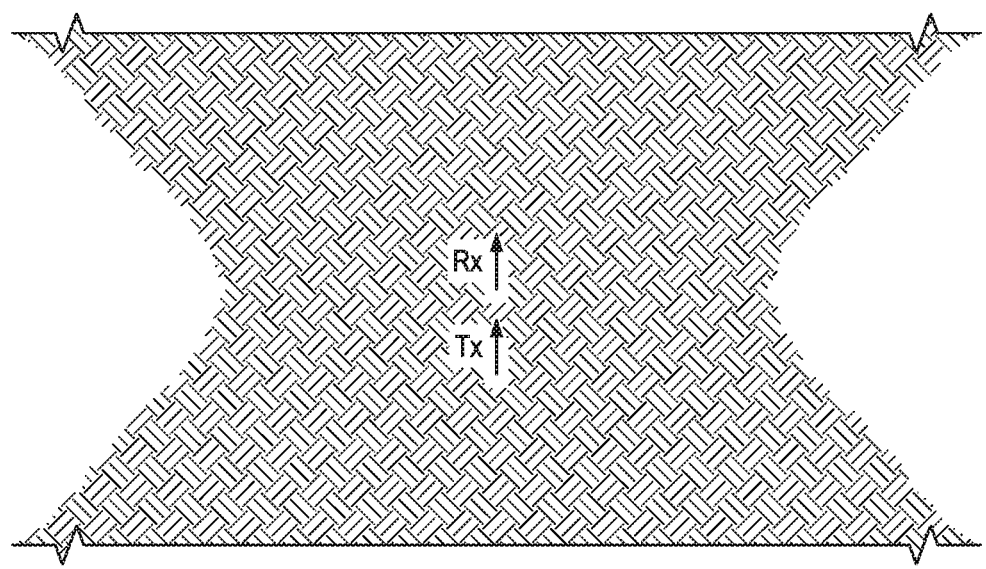
FIG. 8 illustrates a vertical one dimensional (V1D) resistivity model, constructed according to the principles of the disclosure.

In yet another embodiment, a vertical one-dimensional (V1D) resistivity model may be constructed as a juxtaposition of layers populated by discrete values of the electrical properties (assuming that the electrical properties are homogeneous in the one dimensional (1D) model's transverse direction) and the EM field values, sensitivities, and/or the like, which may be modeled using a 1D numerical simulator. This V1D resistivity model, however, may be an oversimplified model and may not account for the effects of the well casing and borehole. Hence, calibration constants computed from this particular model may need to be compensated for the effects of the well casing and borehole in addition to any intrinsic imperfections in the sensing system. This may allow the well casing and the borehole to be removed from the resistivity model, as shown in FIG. 8, and may be used for inverting time-lapse measurements.

Figure 9:
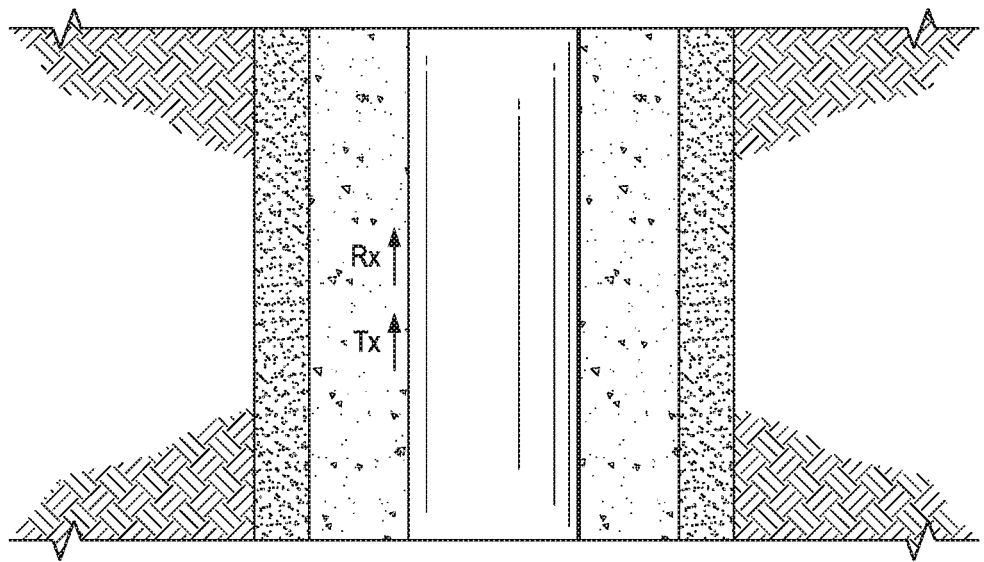
FIG. 9 illustrates a radial one dimensional (R1D) resistivity model, constructed according to the principles of the disclosure.

In yet another embodiment, a radial one-dimensional (R1D) resistivity model may be constructed as a juxtaposition of layers populated by discrete values of the electrical properties (assuming that the electrical properties are homogeneous in the vertical and axial directions), as shown in FIG. 9. This particular resistivity model may neglect the effect of shoulder beds, and hence may be used in relatively thick beds, in which the transmitter/sensor spacing is much less than the bed thickness. Also, the discretization of the earth model may be appropriate for the dimensionality and accuracy of the numerical simulator.

The properties of the monitoring system, such as, for example, transmitter/sensor locations, orientations and spacing, monitoring system power level, monitoring system operation frequency, and/or the like, may be supplied to the resistivity model. The transmitters/sensors spacing may be known from the monitoring system design and may hence be directly supplied to the model. Alternatively, the exact locations of the transmitters and sensors after installation may be estimated by running through casing wireline tools. This may improve the accuracy of the model especially when large shifts of the transmitter and sensor positions are expected during installation.

Referring back to FIG. 4, once the resistivity model is created or constructed (at 418), a resistivity model simulation may be performed (at 420), for example, by using the computing device 10, which may include a numerical simulator. The numerical simulator may be based on one or more of analytical, semi-analytical, finite-difference, finite-volume, finite-element, boundary-element, integral equation methods, and the like, that may be implemented in Cartesian, cylindrical and polar coordinates. The numerical simulator may be programmed on serial and/or parallel processing computing architectures. Upon completing the numerical simulation of the resistivity model (at 420), the synthetic response may be obtained.

The measured response may be obtained independently from the above steps to obtain the synthetic response. Referring to FIG. 4, once the logging tool is dispatched to create the resistivity log (at 410), the monitoring system may be installed (at 421) at the well. A casing string may also be installed in the well along with the monitoring system. The monitoring system may be installed on a permanent basis, and the well may be completed after the resistivity log is completed (at 410) and the monitoring system is installed (at 421). A first set of EM field values of the formation may then be measured (at 422) using the monitoring system. Additionally, the actual transmitter and sensor locations may be determined (at 424), which may be provided to construct the resistivity model (at 418). The measured response may be obtained based on the first set of EM field values.

Assuming that the formation properties, such as, for example, fluid saturation, resistivity and/or the like, have not been changed significantly from when the resistivity log was created (at 410) to when the first set of EM field values was measured (at 422), the measured EM field values based on the first set of EM field values may then be matched to the synthetic response to calculate a set of calibration values or constants (at 430), using, for example, the computing device 10. For example, for each sensor i, a calibration constant $C_i$ may be calculated as follows:

$$C_i = \frac{V_{synth,i}(t=0)}{V_{meas,i}(t=0)},$$

wherein $V_{synth,i}(t=0)$ is the synthetic response of an $i^{th}$ sensor computed from the resistivity data (from 412), which is derived from the resistivity logs (at 410), and $V_{meas,i}(t=0)$ is the measured response of the $i^{th}$ sensor obtained after the monitoring system is installed and the well is completed. The synthetic and measured responses and the calibration constants may be complex-valued quantities with an associated phase and amplitude value in the phase domain. The phase value may be indicative of the phase difference between the received signal and a reference, such as, for example, the transmitter or the like. Similarly, the amplitude value may be indicative of the amplitude of the signal in absolute form, or relative to reference amplitude, such as, for example, the current that is used in the source excitation, or the like.

Upon obtaining the set of calibration values (at 430), one or more subsequent time-lapse measurements may be carried out using the monitoring system to measure a second set of EM field values (at 440). The set of calibration values/constants (from 430) may then be applied to the second set of EM field values (at 450) to obtain a set of calibrated measurement, using, for example, the computing device 10. For example, the calibration constants may be mathematically applied to the subsequent time-lapse measurements (i.e., second set of EM field values) as follows:

$$V_{meas,i}^{cal.}(t) = V_{meas,i}(t) \times C_i,$$

wherein $V_{meas,i}(t)$ is the measured response at time t, and $V_{meas,i}^{cal.}(t)$ is the calibrated measurement at time t. The calibrated measurements may be complex quantities with amplitude and phase, and the calibration factors may also be complex quantities. Through a subset of such generalization, the calibrated measurements and calibration factors may become real quantities.

Based on the second set of the EM field values and the set of the calibrated measurements, saturation of a substance in the formation may be determined (at 460). For example, the calibrated measurements may be processed and inverted for quantities of interest (e.g., distance to water-flood front and resistivity of water-flood), using, for example, the computing device 10. Model-based inversion may be applied, and the synthetic resistivity model used in calibration may used as the background model. Also, synthetic substance saturation (e.g., water-flood) may be inserted into the resistivity background model (from 418). The parameters of the water-flood in the synthetic model may be optimized to minimize a misfit between the calibrated response and the synthetic response.

Figure 10C:
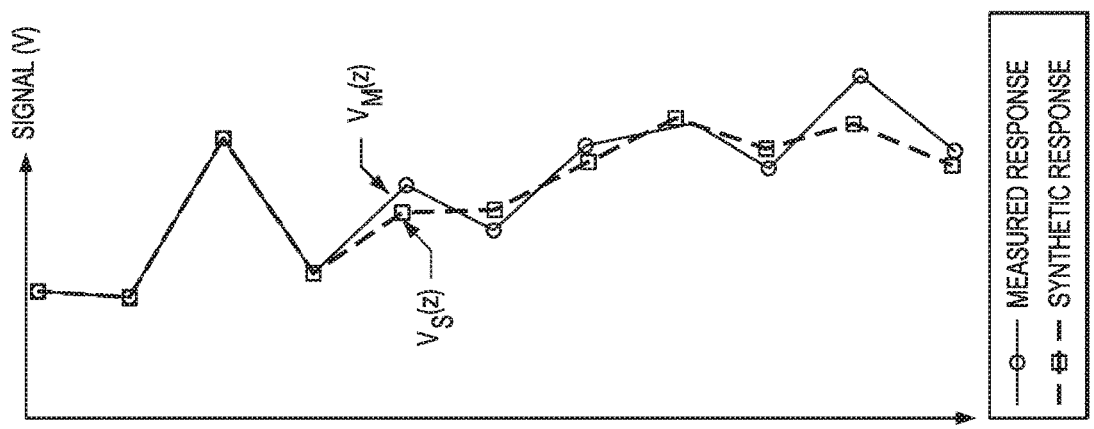
FIG. 10C illustrates a graph of a measured response vs. a synthetic response according to the principles of the disclosure.
Figure 10B:
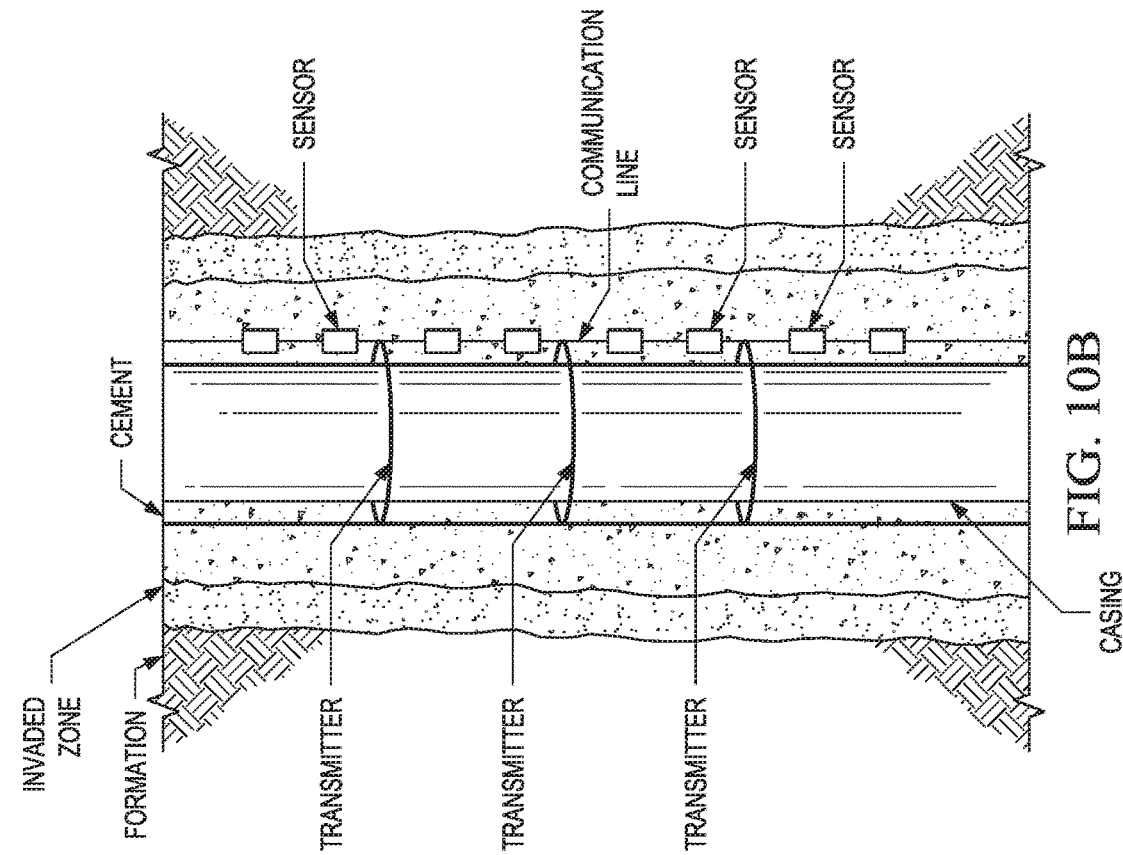
FIG. 10B illustrates a resistivity model, constructed according to the principles of the disclosure.
Figure 10A:
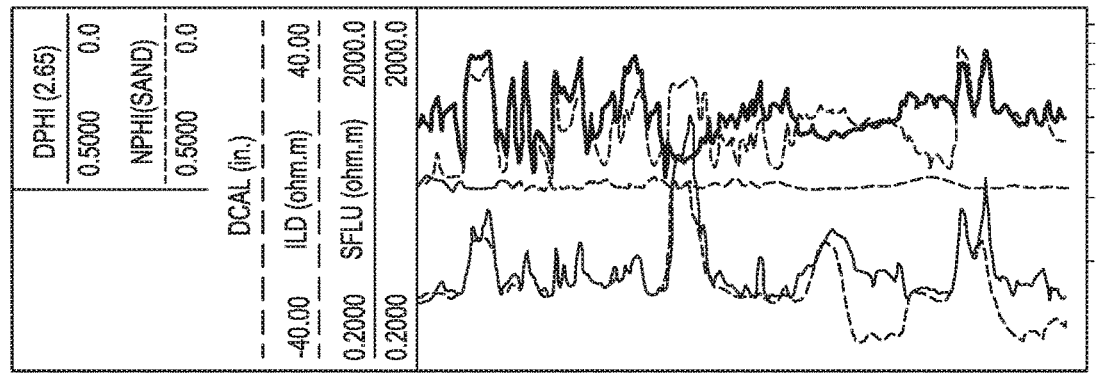
FIG. 10A illustrates a graph of wireline logs according to the principles of the disclosure.

An example of the calibration process is illustrated in FIGS. 10A, 10B and 10C. In particular, FIG. 10A illustrates an example of open-hole wireline logs, which may include a caliper log, a deep resistivity log, a shallow resistivity log, and/or the like. FIG. 10B illustrates a 2D resistivity model of the formation, which may be constructed based on the resistivity logs shown in FIG. 10A with different depths of investigation. The 2D resistivity model may include an invaded zone and a layered formation, as shown in FIG. 10B. The casing and cement may also be added to the model. The transmitter and sensor may also be added to the model. A 2D simulator may be used to compute the synthetic response of the monitoring system. FIG. 10C shows a schematic plot of the measured response versus synthetic response values at each sensor. The calibration constants may be computed to match the measured response from each sensor to the synthetic response.

Figure 11A:
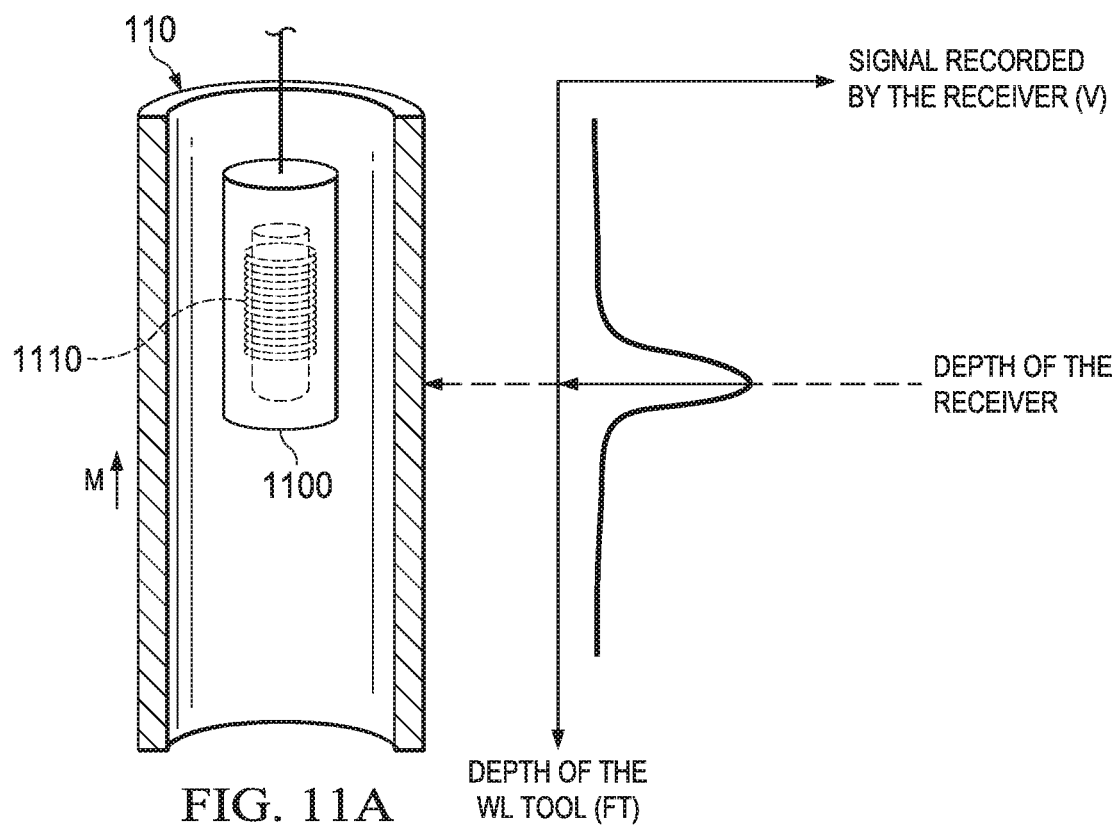
FIGS. 11A, 11B and 11C illustrate side perspective views of various wireline through-casing tools, constructed according to the principles of the disclosure.
Figure 11B:
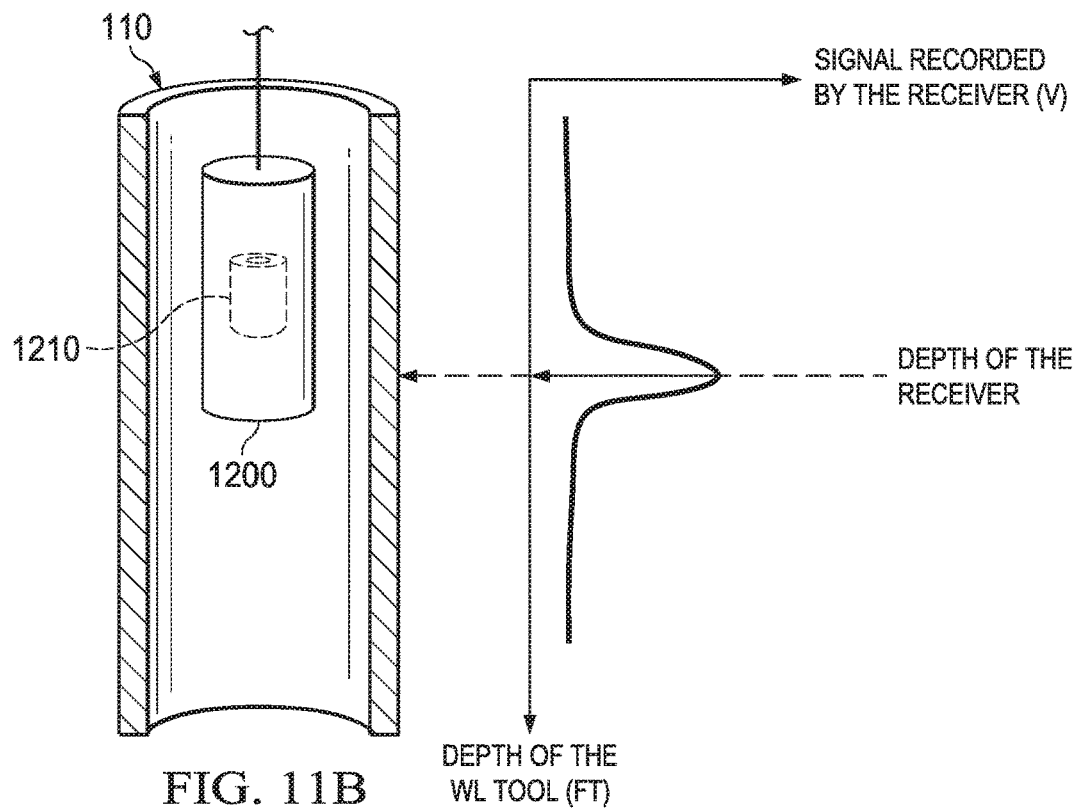
Figure 11C:
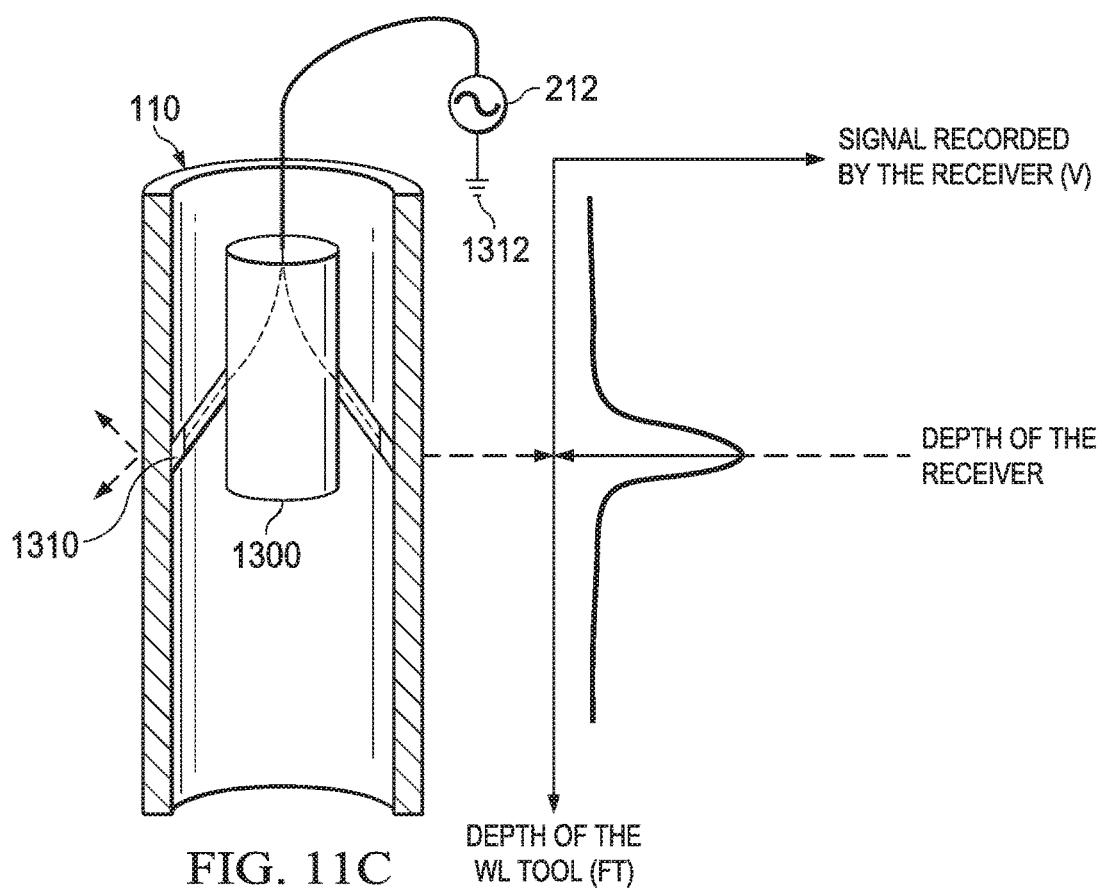

As described above, the actual sensor locations after installation may be accurately estimated (at 424 in FIG. 4), for example, by running a through-casing wireline tool and recording the signal at each sensor as a function of the depth of the wireline tool. The peak of the recorded signal may point out to the depth of the sensor. FIGS. 11A, 11B and 11C illustrate examples of various wireline tools for estimating depths of axial EM field sensors. In particular, FIG. 11A illustrates a wireline logging tool 1100, constructed according to the principles of the disclosure. The wireline logging tool 1100 may be used in conjunction with a transmitting coil 1110. The wireline logging tool 1100 may be logged inside the casing 110. An EM corrosion detection tool may be used for this purpose. The transmitting coil 1110 may be energized with a low frequency current in an order of about 10 Hz to about 100 Hz such that the EM fields may penetrate through the casing 110. In multiple casing tubulars, the wireline tool 1100 may be logged inside an innermost pipe (i.e., production tubing), and the transmitting coil 1110 may be energized with a lower frequency current (e.g., less than about 10 Hz) to penetrate through the multiple casings. The signal level at the sensor may peak when the transmitting coil 1110 is aligned with the sensor. In FIG. 2A, the transmitting coil 214 of the monitoring system 100 may be installed on casing collars, and therefore the depth of the coil 214 may be estimated by running a casing collar locator (CLL).

FIG. 11B illustrates another wireline logging tool 1200 for estimating depths of axial EM field sensors, constructed according to the principles of the disclosure. The wireline logging tool 1200 may be used in conjunction with electric bipoles, and may be equipped with a transmitter toroid 1210, which may be energized with a low frequency current in the order of about 10 Hz to about 100 Hz so that the EM fields may penetrate through the casing. The casing 110 may be insulated. In the multiple casing tubulars, the wireline tool 1200 may be run inside the innermost pipe (i.e., production tubing). A lower frequency current, e.g., less than about 10 Hz, may be used to penetrate through the multiple casings. The signal level measured by the wireline tool 1200 may peak when the transmitter toroid 1210 is aligned with the sensor. The depth of the injection and return electrodes forming the bipole can be estimated by running a casing collar locator (CLL).

FIG. 11C illustrates yet another wireline logging tool 1300, constructed according to the principles of the disclosure, which may be used for estimating depths of radial EM field sensors. The logging tool 1300 may be used in conjunction with the casing 110 as a source, and may be equipped with deployable arms 1310 having contact electrodes. When the wireline logging tool 1300 is logged inside the casing 110, the contact electrodes may contact the casing 110 and inject a low frequency current to the casing 110. The low frequency current may flows into the formation and eventually flows towards a return electrode 1312 formed on the surface, and a signal level peak may peak when the contact electrodes are aligned with the sensor.

Accordingly, the disclosure provides a method for post-deployment in-situ calibration through matching EM data acquired from an EM monitoring system with EM data acquired from a wireline system. The method may compensate for dislocation/disorientation of the sensors while placement, damage to the sensors due to sliding against the rough borehole wall, degradation of the sensor performance due to changes in temperature and/or pressure, downhole gases and/or fluids, mechanical/electrical deterioration with time, and/or the like. Also, the synthetic resistivity model developed for the calibration process may be used as a background resistivity model for inverting time-lapse measurements. Through-casing tools may be used to estimate the depth of permanent sensors deployed behind the casing to improve the accuracy of the synthetic model.

The disclosure also provides workflows required for calibrating a permanent EM reservoir monitor system based on various resistivity models (e.g., 1D model, 2D model, 3D model, and/or the like). The calibration method may be integrated as part of an EM reservoir monitoring system, which may be a fiber optic-based EM reservoir monitoring system. The disclosure further provides an accurate inversion of time-lapse measurements through a calibrating baseline measurement to a background resistivity model.

The following clauses represent additional embodiments of the disclosure:

Clause 1. A substance saturation sensing method, comprising:
making a resistivity measurement of a formation proximate to a well with a logging tool prior to installation of a casing string in the well;
after installing the casing string in the well, making a first set of measurements of the formation with a monitoring system to generate a measured response;
calculating a set of calibration values based on the first set of measurements to produce a resistivity that matches the resistivity measurement;
making a second set of measurements of the formation with the monitoring system during or after saturating of a substance occurs in the formation; and
determining at least one parameter indicative of the saturating of the substance in the formation based on the second set of the measurements and the set of calibration values.

Clause 2. The method of Clause 1, further comprising: obtaining resistivity data from the resistivity measurement; defining a grid for a resistivity model simulation, the grid comprising a plurality of grid points; populating a resistivity value at each of the plurality of grid points based on the resistivity data; creating a resistivity model of the monitoring system and the formation; and performing the resistivity model simulation to generate a synthetic response.

Clause 3. The method of Clause 2, wherein the calculating the set of calibration values comprises calculating a set of calibration constants to match the measured response to the synthetic response.

Clause 4. The method of Clause 3, further comprising applying the set of calibration constants to the second set of measurements to generate a calibrated set of measurements, wherein the least one parameter is determined based on the calibrated set of measurements.

Clause 5. A method for monitoring substance saturation in a formation, comprising:
obtaining resistivity data of a formation proximate to a well prior to installing a casing string in the well;
installing the casing string and a monitoring system in the well;
measuring a first set of electro-magnetic (EM) field values of the formation with the monitoring system;
generating a synthetic response based on the resistivity data;
generating a measured response based on the first set of EM field values;
obtaining a set of calibration values based on the measured response and the synthetic response;
measuring a second set of EM field values of the formation with the monitoring system after the measuring the first set of EM field values; and
determining at least one parameter indicative of saturating of a substance in the formation based on the second set of the EM field values and the set of calibration values.

Clause 6. The method of Clause 5, wherein the generating the synthetic response comprises: defining a grid for a resistivity model simulation of the formation, the grid comprising a plurality of grid points; populating a resistivity value at each of the plurality of grid points based on the resistivity data; creating a resistivity model of the monitoring system and the formation; and performing the resistivity model simulation to generate the synthetic response.

Clause 7. The method of Clause 6, further comprising applying the set of calibration values to the second set of EM field values to create a calibrated set of EM field values.

Clause 8. The method of Clause 7, wherein the determining at least one parameter comprises processing the calibrate set of EM field values to determine the at least one parameter indicative of saturating of the substance.

Clause 9. A method for sensing saturation of a substance in a formation, comprising:
generating a synthetic response based on resistivity data of a formation proximate to a well;
generating a measured response based on a first set of electro-magnetic (EM) field values of the formation;
obtaining a set of calibration values for the measured response to match the synthetic response;
measuring a second set of EM field values of the formation after the first set of EM field values are measured;
applying the set of calibration values to the second set of EM field values to generate a calibrated set of EM field values; and
determining at least one parameters indicative of saturating of the substance in the formation based on the calibrated set of EM field values.

Clause 10. The method of Clause 9, further comprising: measuring a set of resistivity values of the formation prior installing a casing string; installing the casing string and a monitoring system in the well; and measuring the first set of EM field values using the monitoring system.

Clause 11. The method of Clause 10, wherein the generating the synthetic response comprises: defining a grid for a resistivity model simulation of the formation, the grid comprising a plurality of grid points; populating a resistivity value for each of the grid points based on the resistivity data; and creating a resistivity model of the monitoring system and the formation; and performing the resistivity model simulation to generate the synthetic response.

Clause 12. The method of Clauses 1, 5 and 9, wherein the substance is water.

Clause 13. The method of Clause 1, 5 and 10, wherein the monitoring system is deployed to or installed in the well on a permanent basis.

Clause 14. The method of Clause 1, 5 and 10, wherein the monitoring system comprises a fiber optic system.

Clause 15. The method of Clause 2, 6 and 11, wherein the populating the resistivity value comprises performing interpolation or extrapolation of the resistivity data.

Clause 16. The method of Clause 2, 6 and 11, wherein the resistivity value is populated based on at least one of a borehole property, a casing property and a cement property.

Clause 17. The method of Clause 2, 6 and 11, wherein the monitoring system comprises a plurality of transmitter and a plurality of sensors, and wherein the resistivity model is created based on a property of the monitoring system, the property of the monitoring system comprising at least one of a location of each sensor, an orientation of each sensor, a location of each transmitter, a power level of the monitoring system, and an operation frequency of the monitoring system.

Clause 18. The method of Clause 17, further comprising: measuring a plurality of EM field values using the plurality of sensors as a wireline tool is logged along a casing of the well; and determining the location of each sensor based on the plurality of EM field values detected by each sensor.

Clause 19. The method of Clause 18, wherein the location of each sensor is determined based on a peak value of the plurality of EM field values.

Clause 20. The method of Clause 18, wherein the wireline tool comprises at least one of a transmitter coil, a toroid and a contact electrode.

Clause 21. The method of Clause 17, further comprising: measuring a plurality of EM field values along a casing of the well using a wireline measuring tool; and determining the location of each transmitter based on the plurality of EM field values measured by the wireline measuring tool.

Clause 22. The method of Clause 21, wherein the wireline measuring tool comprises a casing collar locator.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A substance saturation sensing method, comprising:
    making a resistivity measurement of a formation proximate to a well with a logging tool prior to installation of a casing in the well; making a multi-arm caliper measurement of the well prior to installing the casing; wherein the casing comprises at least two collars, and each of the at least two collars comprises an electrode, and wherein a portion of the casing between the electrodes is insulated;
    after installing the casing in the well, making a first set of measurements of the formation with a monitoring system to generate a measured response, the monitoring system comprising at least one transmitter, the at least one transmitter including at least one of the electrodes, wherein the at least one of the electrodes injects electrical current into the formation, wherein the injected electrical current generates a primary field and a secondary field, and wherein the monitoring system comprises at least one sensor to measure the primary field and the secondary field;
    calculating a set of calibration values based on the first set of measurements and the resistivity measurement to produce a resistivity that matches the resistivity measurement;
    making a second set of measurements of the formation with the monitoring system during or after saturation of a substance occurs in the formation; and
    determining at least one parameter indicative of the saturation of the substance in the formation based on the second set of measurements and the set of calibration values.

2. The method of claim 1, further comprising:
    obtaining resistivity data from the resistivity measurement;
    defining a grid for a resistivity model simulation, the grid comprising a plurality of grid points;
    populating a resistivity value at each of the plurality of grid points based on the resistivity data;
    creating a resistivity model of the monitoring system and the formation; and
    performing the resistivity model simulation to generate a synthetic response.

3. The method of claim 2, wherein calculating the set of calibration values comprises calculating a set of calibration constants to match the measured response to the synthetic response.

4. The method of claim 3, further comprising applying the set of calibration constants to the second set of measurements to generate a calibrated set of measurements, wherein the at least one parameter is determined based on the calibrated set of measurements.

5. The method of claim 2, wherein populating the resistivity value comprises performing interpolation or extrapolation of the resistivity data.

6. The method of claim 2, wherein the resistivity value is populated based on at least one of a borehole property, a casing property and a cement property.

7. The method of claim 2, wherein the monitoring system comprises a plurality of transmitters and a plurality of sensors, and
wherein the resistivity model is created based on a property of the monitoring system, the property of the monitoring system comprising at least one of a location of each sensor, an orientation of each sensor, a location of each transmitter, a power level of the monitoring system, and an operation frequency of the monitoring system.

8. The method of claim 7, further comprising:
measuring a plurality of EM field values using the plurality of sensors as a wireline tool is logged along the casing of the well; and
determining the location of each sensor based on the plurality of EM field values detected by each sensor.

9. The method of claim 8, wherein the location of each sensor is determined based on a peak value of the plurality of EM field values.

10. The method of claim 8, wherein the wireline tool comprises at least one of a transmitter coil, a toroid and a contact electrode.

11. The method of claim 1, wherein the substance is water.

12. The method of claim 1, wherein the monitoring system is deployed to or installed in the well on a permanent basis.

13. The method of claim 1, wherein the monitoring system comprises a fiber optic system.

14. The method of claim 1, wherein the at least one transmitter comprises a plurality of transmitters and the at least one sensor comprises a plurality of sensors.

15. The method of claim 1, wherein the primary field is independent of any interaction with the formation, and the secondary field is produced as a result of interaction with the formation.

16. The method of claim 1, wherein the step of calculating the set of calibration values is further based on borehole shape including at least one of: outer diameter, thickness, electrical conductivity and magnetic permeability.

17. The method of claim 1, wherein the step of calculating the set of calibration values is also based on magnetic permeability of the casing of the well.

18. A method for monitoring substance saturation in a formation, comprising:
obtaining resistivity data of the formation proximate to a well prior to installing a casing in the well; making a multi-arm caliper measurement of the well prior to installing the casing;
installing the casing and a monitoring system in the well;
wherein the casing comprises at least two collars, and each of the at least two collars comprises an electrode, and wherein a portion of the casing between the electrodes is insulated;
measuring a first set of electro-magnetic (EM) field values of the formation with the monitoring system, the monitoring system comprising at least one transmitter, the at least one transmitter including at least one of the electrodes, wherein the at least one of the electrodes injects electrical current into the formation, wherein the injected electrical current generates a primary field and a secondary field, and wherein the monitoring system comprises at least one sensor to measure the primary field and the secondary field;
generating a synthetic response based on the resistivity data and magnetic permeability of the casing string;
generating a measured response based on the first set of EM field values;
obtaining a set of calibration values based on the measured response and, the synthetic response;
measuring a second set of EM field values of the formation with the monitoring system after measuring the first set of EM field values; and
determining at least one parameter indicative of saturation of a substance in the formation based on the second set of EM field values and the set of calibration values.

19. The method of claim 18, wherein generating the synthetic response comprises:
defining a grid for a resistivity model simulation of the formation, the grid comprising a plurality of grid points;
populating a resistivity value at each of the plurality of grid points based on the resistivity data;
creating a resistivity model of the monitoring system and the formation; and
performing the resistivity model simulation to generate the synthetic response.

20. The method of claim 19, further comprising applying the set of calibration values to the second set of EM field values to create a calibrated set of EM field values.

21. The method of claim 20, wherein determining the at least one parameter comprises processing the calibrated set of EM field values to determine the at least one parameter indicative of the saturation of the substance.

22. The method of claim 18, wherein the at least one transmitter comprises a plurality of transmitters, and the at least one sensor comprises a plurality of sensors.

23. The method of claim 18, wherein the step of generating the synthetic response is further based on borehole shape including at least one of: outer diameter, thickness, electrical conductivity and magnetic permeability.

24. The method of claim 18, further comprising calibrating the at least one sensor with a logging tool equipped with deployable arms having contact electrodes to contact the casing.

25. A method for sensing saturation of a substance in a formation, comprising:
installing a casing and a monitoring system in a well;
wherein the casing comprises at least two collars, and each of the at least two collars comprises an electrode, and wherein a portion of the casing between the electrodes is insulated; making a multi-arm caliper measurement of the well prior to installing the casing;
generating a synthetic response based on magnetic permeability of the casing in the well and resistivity data of the formation proximate to the well using the monitoring system comprising at least one transmitter, the at least one transmitter including at least one electrode, wherein the at least one electrode injects an electrical current into the formation, wherein the injected electrical current generates a primary field and a secondary field, and wherein the monitoring system comprises at least one sensor to measure the primary field and the secondary field;

generating a measured response based on a first set of electro-magnetic (EM) field values of the formation;

obtaining a set of calibration values for the measured response to match the synthetic response;

measuring a second set of EM field values of the formation after the first set of EM field values are measured;

applying the set of calibration values to the second set of EM field values to generate a calibrated set of EM field values; and determining at least one parameter indicative of the saturation of the substance in the formation based on the calibrated set of EM field values.

26. The method of claim 25, further comprising:

measuring a set of resistivity values of the formation prior to installing the casing;

installing the casing and the monitoring system in the well; and measuring the first set of EM field values using the monitoring system.

27. The method of claim 26, wherein generating the synthetic response comprises:

defining a grid for a resistivity model simulation of the formation and borehole size, the grid comprising a plurality of grid points;

populating a resistivity value for each of the grid points based on the resistivity data; and creating a resistivity model of the monitoring system and the formation; and performing the resistivity model simulation to generate the synthetic response.

28. The method of claim 25, wherein the at least one transmitter comprises a plurality of transmitters, and the at least one sensor comprises a plurality of sensors.

29. The method of claim 25, wherein the step of generating the synthetic response is further based on borehole shape including at least one of: outer diameter, thickness, electrical conductivity and magnetic permeability.

30. The method of claim 25, further comprising calibrating the at least one sensor with a logging tool equipped with deployable arms having contact electrodes to contact the casing.

* * * * *